Sept. 2, 1924.
C. E. BRADBURN ET AL
1,507,104
FLUID BRAKE
Filed April 2, 1923
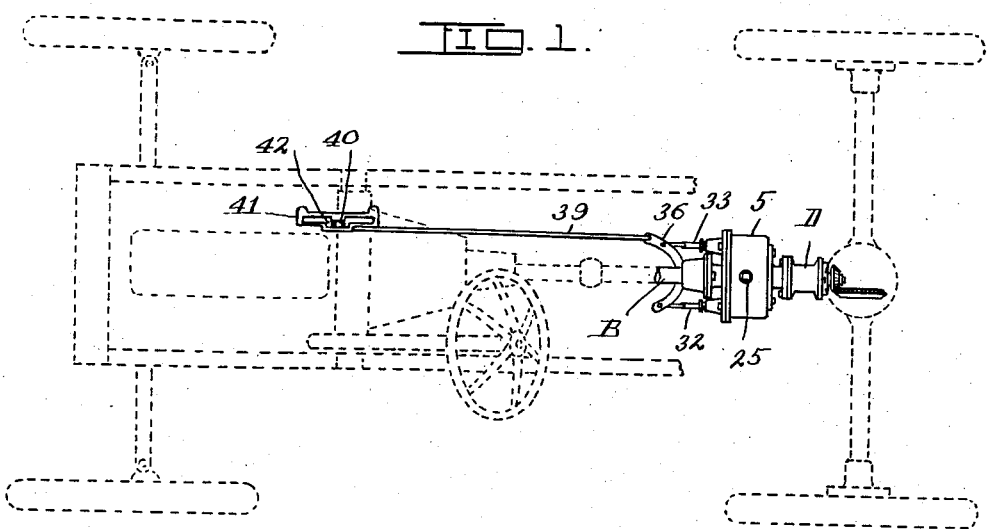
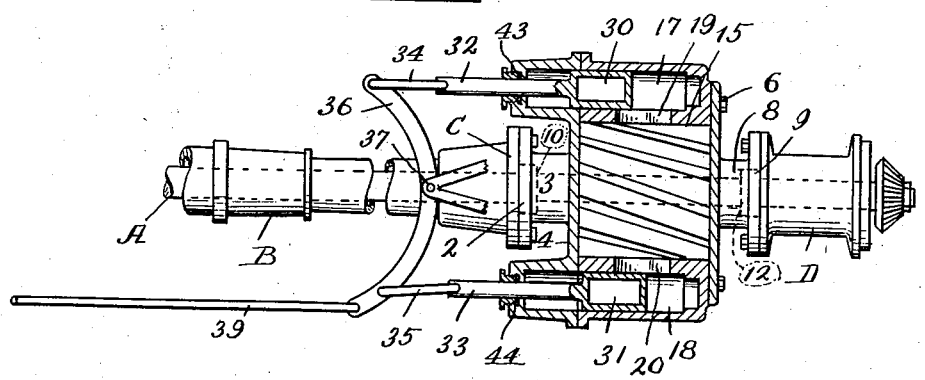
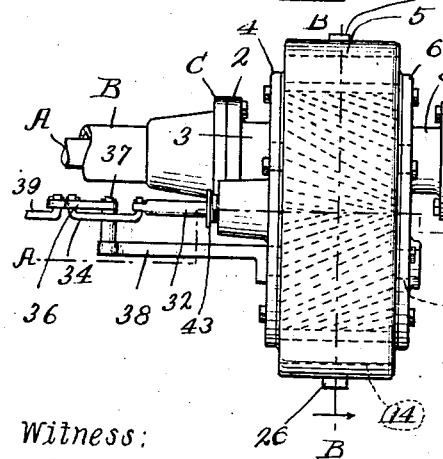
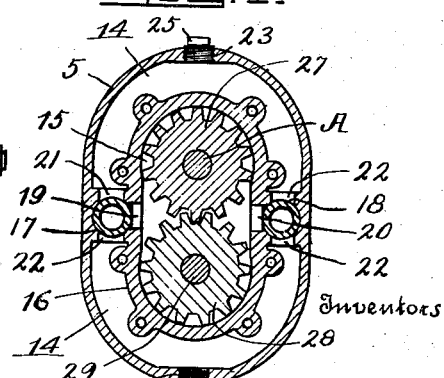
Witness:
Fred C. Fischer.
Inventors
Curtis E. Bradburn and August Finke,
By F. G. Fischer, Attorney.

Patented Sept. 2, 1924.

1,507,104

UNITED STATES PATENT OFFICE.

CURTIS E. BRADBURN AND AUGUST FINKE, OF GARDEN CITY, KANSAS.

FLUID BRAKE.

Application filed April 2, 1923. Serial No. 629,346.

*To all whom it may concern:*

Be it known that we, CURTIS E. BRADBURN and AUGUST FINKE, citizens of the United States, residing at Garden City, in the county of Finney and State of Kansas, have invented certain new and useful Improvements in Fluid Brakes, of which the following is a specification.

This invention pertains to fluid brakes intended primarily for use on motor vehicles, and one object is to provide cooperating gears operatively connected, preferably, to the drive shaft so as to be rotated thereby, said gears constituting means for setting up a circulation of fluid, preferably, in the form of a lubricating oil.

A further object is to provide means under the control of the driver, whereby the circulation of the fluid may be regulated to retard or stop the movement of the vehicle as desired.

A further object is to provide a brake of this character of simple and compact construction and which can be combined with the drive shaft or axle without necessitating any material changes in design.

Other objects will hereinafter appear, and in order that the invention may be fully understood, reference will now be had to the accompanying drawings, in which:

Fig. 1 is a side elevation of the brake applied to an automobile drive shaft and its housing.

Fig. 2 is an inverted plan view partly in cross section on line A—A of Fig. 3.

Fig. 3 is a side elevation of the brake applied to the drive shaft and its housing.

Fig. 4 is a vertical cross section on line B—B of Fig. 3.

Referring now in detail to the various parts, A designates the drive shaft of a motor vehicle, and B the housing for said drive shaft A. The housing B is provided at its rear end with a flange C adapted to be bolted or otherwise secured to a flange 2 on an extension 3 formed integral with a face plate 4 closing the forward side of a case 5. The rear side of the case 5 is closed with a face plate 6 similar to the face plate 4 and like the same having an extension 8 with a flange 9 bolted or otherwise secured to the forward portion of a supplemental housing D, which encloses the rear portion of the drive shaft A. The extensions 3 and 8 are equipped with internal packing 10 and 12, respectively, to prevent the fluid within the case 5 from leaking out through the openings through which the drive shaft A extends.

The case 5 is divided into reservoirs 14 and a gear chamber 15 by a partition 16 provided with oppositely-disposed valve chambers 17 and 18. The valve chambers 17 and 18 communicate with the gear chamber 15 through ports 19 and 20 and with the reservoirs 14 through ports 21 and 22, respectively. The reservoirs 14 are supplied with a fluid, preferably lubricating oil, through an opening 23 in the upper portion of the case 5 which, also, has an outlet 24 in its lower portion through which the fluid may be drained when desired. The openings 23 and 24 are normally closed with screw plugs 25 and 26, respectively.

The gear chamber 15 is provided with a pair of intermeshing gear wheels 27 and 28, the former of which is fixedly mounted upon the drive shaft A, and the latter upon a counter-shaft 29 carried by the face plates 4 and 6.

The valve chambers 17 and 18 are equipped with piston valves 30 and 31 to control the flow of fluid through the ports 21 and 22, respectively. Said valves 30 and 31 have stems 32 and 33 connected to links 34 and 35, respectively. The links 34 and 35 are connected at their forward ends to a rocker arm 36 mounted upon a pivot 37 carried by a yoke 38 bolted or otherwise secured to the face plate 4. A connecting rod 39 extends forwardly from the rocker arm 36 to a suitable control lever 40 arranged within convenient reach of the driver. The lever 40 is, preferably, in the form of a hand lever and is associated with a segment 41 having a slotted portion with a central offset 42 for holding the lever in neutral position, so that it may in turn hold the valves 30 and 31 in neutral position. Stuffing boxes 43 and 44 are installed on the face plate 4 to prevent oil escaping by way of the stems 32 and 33, respectively.

The two gears 27 and 28 fit snugly within the chamber 15 and as they intermesh it is apparent that as the gear 27 rotates with the drive shaft A it will in turn rotate the gear 28 and the two will cooperate to force the fluid contents of the gear chamber 15 into the reservoirs 14 through the connecting ports. Normally the valves 30 and 31 are adjusted to neutral position to uncover one half of the respective ports 19 and 20 and thus permit free circulation of the fluid, but when it is desired to retard or check the travel of the vehicle, said valves 28 and 29 are adjusted to uncover to a greater degree the suction ports and close to a greater degree the discharge ports, with the result that the flow of fluid from the gear chamber 15 is retarded and as said fluid is noncompressible it will exert a corresponding retarding influence upon the gears 27 and 28. The valves 30 and 31 may be adjusted to check either the forward or backward movement of the vehicle as desired.

From the foregoing description, taken in connection with the drawings, it is apparent that we have produced a fluid brake embodying the advantages above pointed out, and while the preferred form has been disclosed in the drawings, it is to be understood that we reserve the right to make such changes in the construction, combination and arrangement of parts as properly fall within the spirit and scope of the appended claims.

Having thus described our invention, what we claim and desire to secure by Letters Patent, is:

1. In a fluid brake the combination with a housing and a drive shaft therein, of a brake case supported by said housing and embodying a gear chamber and a fluid reservoir surrounding said gear chamber and separated therefrom by a partition, gears within the gear chamber, one of said gears being connected to and revolvable with the drive shaft and intermeshing with the companion gear to rotate the same and circulate the fluid through the gear case and the reservoir, valve chambers communicating with opposite sides of the gear chamber and the reservoir through ports in the partition, and valves operably mounted within said valve chambers to control the circulation of the fluid.

2. In a fluid brake the combination with a housing and a drive shaft therein, of a brake case supported by said housing and embodying a gear chamber and a fluid reservoir, gears within the gear chamber, one of said gears being connected to and revolvable with the drive shaft and intermeshing with the companion gear to rotate the same and circulate the fluid through the gear case and the reservoir, valve chambers communicating with the gear chamber and the reservoir, valves operably mounted within said valve chambers to control the circulation of the fluid, and manual means for moving said valves in opposite directions to each other.

3. In a fluid brake the combination with a housing and a drive shaft therein, of a brake case supported by said housing, a partition dividing said case into a gear chamber and a reservoir, valve chambers dividing the reservoir into two compartments and communicating with said compartments and the gear case through suitable ports, and valves operably mounted within said valve chambers to control the circulation of the fluid.

4. In a fluid brake the combination with a housing and a drive shaft therein, of a brake case supported by said housing and embodying a gear chamber and a fluid reservoir, gears within the gear chamber, one of said gears being connected to and revolvable with the drive shaft and intermeshing with the companion gear to rotate the same and circulate the fluid through the gear case and the reservoir, valve chambers communicating with the gear chamber and the reservoir, and piston valves operably mounted within said valve chambers to control the circulation of the fluid.

5. In a fluid brake the combination with a housing and a drive shaft therein, of a brake case supported by said housing and embodying a gear chamber and a fluid reservoir, gears within the gear chamber, one of said gears being connected to and revolvable with the drive shaft and intermeshing with the companion gear to rotate the same and circulate the fluid through the gear case and the reservoir, valve chambers communicating with the gear chamber and the reservoir, valves operably mounted within said valve chambers to control the circulation of the fluid, a rocker arm connected to said valves to move the same in opposite directions to each other, and manual means for controlling said rocker arm.

6. In a fluid brake, a case having a gear chamber and a fluid reservoir, intermeshing gears within said gear chamber to circulate the fluid through the same and the reservoir, valve chambers communicating with opposite sides of the gear chamber and the reservoir, and slide valves operably mounted within said valve chambers to control the circulation of the fluid.

In testimony whereof we affix our signatures, in the presence of two witnesses.

CURTIS E. BRADBURN.
AUGUST FINKE.

Witnesses:
WILLIAM WONER,
S. N. RECTOR.